(12) United States Patent
Hennebert

(10) Patent No.: US 10,158,636 B2
(45) Date of Patent: Dec. 18, 2018

(54) METHOD FOR SETTING UP A SECURE END-TO-END COMMUNICATION BETWEEN A USER TERMINAL AND A CONNECTED OBJECT

(71) Applicant: Commissariat A L'Energie Atomique et aux Energies Alternatives, Paris (FR)

(72) Inventor: Christine Hennebert, La Tronche (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 241 days.

(21) Appl. No.: 15/358,423

(22) Filed: Nov. 22, 2016

(65) Prior Publication Data

US 2017/0155647 A1 Jun. 1, 2017

(30) Foreign Application Priority Data

Nov. 26, 2015 (FR) ...................................... 15 61408

(51) Int. Cl.
*H04L 9/32* (2006.01)
*H04L 29/06* (2006.01)

(52) U.S. Cl.
CPC ........ *H04L 63/0876* (2013.01); *H04L 9/3234* (2013.01); *H04L 9/3247* (2013.01); *H04L 63/0442* (2013.01); *H04L 63/061* (2013.01); *H04L 63/08* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 5,694,471 A | 12/1997 | Chen et al. | |
| 2008/0130902 A1* | 6/2008 | Foo Kune | H04L 63/062 380/286 |
| 2008/0170693 A1 | 7/2008 | Spies et al. | |
| 2012/0190354 A1* | 7/2012 | Merrien | H04W 4/70 455/422.1 |
| 2012/0284506 A1* | 11/2012 | Kravitz | G06Q 40/00 713/151 |
| 2013/0230166 A1 | 9/2013 | Bauchot et al. | |
| 2015/0004901 A1* | 1/2015 | Agiwal | H04W 76/14 455/39 |

(Continued)

OTHER PUBLICATIONS

French Preliminary Search Report dated Sep. 5, 2016 in French Application 15 61408, filed on Nov. 26, 2015 ( with English Translation of Categories of Cited Documents).

*Primary Examiner* — Gary S Gracia
(74) *Attorney, Agent, or Firm* — Oblon, McClelland, Maier & Neustadt, L.L.P.

(57) ABSTRACT

A method for setting up a secure end-to-end communication between a user terminal or a context broker server, and an object connected to the IP infrastructure through a gateway. The method uses an access authorization server and a production server. The method can generate a private and public access key pair ($K_F, Q_F$) within the connected object, particularly using a cryptosystem on an elliptical curve with a small implicit certificate, the access keys being used to set up a secure end-to-end communication.

23 Claims, 7 Drawing Sheets

(56) References Cited

U.S. PATENT DOCUMENTS

2015/0071437 A1* 3/2015 Chastain .............. H04L 9/3273
  380/249
2015/0106616 A1* 4/2015 Nix ........................ H04W 4/70
  713/156

* cited by examiner

METHOD FOR SETTING UP A SECURE END-TO-END COMMUNICATION BETWEEN A USER TERMINAL AND A CONNECTED OBJECT

TECHNICAL DOMAIN

This invention relates to network security and most particularly to the IoT (Internet of Things).

STATE OF PRIOR ART

The appearance of pervasive low throughput radio technologies, adapted to self-contained low energy consumption objects, has recently enabled the development of the Internet of objects (IoT). A user can use the IoT to access information, also called resources, provided by sensors or actuators, often remote and with low endurance. The scheme adopted at the present time consists of virtualising these resources in a gateway or a server, connected to Internet or to the infrastructure. End-to-end security, in other words from the user to the resource, is achieved between the user and the element virtualising the resource. This means that the element that stores the virtual resources is a trusted element.

FIG. 1 represents a classical scenario for a user access to a resource associated with an object.

The user has a "machine" 110, (in the M2M sense), usually a smartphone, a tablet or a computer and is connected to Internet, 150. He can access remote resources provided by connected objects 190 with constraints of memory, calculation power and energy, through an application located on an application server 120 in the Cloud. These objects can communicate with gateways 180 through low energy radio links satisfying communication standards such as IEEE 802.15.4, Bluetooth, Zigbee, etc.

Gateways 180 ensure interoperability between the above mentioned communication standards and those used by gateways for their connection to Internet (for example Wifi, Ethernet, GPRS). On the other hand, gateways 180 are incapable of ensuring interoperability of security protocols between connected objects and Internet. For this reason, they store information output from different connected objects, which means that they must be trusted.

It is known that security of the communication between the user and the virtualisation gateway in such an architecture can be guaranteed by means of encryption. The principles of security by design make it necessary to use a path for the transit of encryption material (encryption keys, tokens, pseudo-random generator seeds) that is distinct from the path followed by the data. In this case, the user starts by identifying himself to a security server 130 using a login/password. If he is successful, the security server distributes the same access token to the user and to the virtualisation gateway 180. This access token confirms that the user has an access right to the resource through a given application (on the applications server). The encryption material, and particularly symmetric encryption keys, are also distributed to the user and to the gateway through a secure channel (SSL/TLS or IPsec). The user and the element storing the virtual resource can then communicate confidentially.

There are various solutions for ensuring a secure end-to-end communication between the user's machine and the connected object.

A first solution is to equip the connected object with a secure element, for example such as a SIM card. However, this solution is excluded in practice in the context of connected objects with very low autonomy in energy.

A second solution consists of pushing the access token and the encryption material from the secure server to the connected object. The access token and possibly the associated cryptographic material then have to pass through a trusted gateway, because it has access to unencrypted information during the protocol conversion. The concept of end-to-end security is then interrupted at the gateway.

A third solution consists of generating or inserting the cryptographic material in the connected object before it is deployed and using an out-of-band channel to transmit it to the authorisation server. For example, the user can firstly bring his smartphone close to the connected object and recover information by an optical method (light signal, scan a QR code on the object), numerically describing the secret value of the symmetric key stored in the object at the time of its deployment. The smartphone then connects to the infrastructure and transmits the symmetric key information to the secure server through a secure channel. In this case, the smartphone behaves like a trusted gateway. The symmetric key is then stored in the user's profile at the security server to set up a secure communication with the connected object. The security server can then push the encryption material (a secret key) as well as an access token to the connected object. The user has the same information through his secure link with the security server and can therefore set up a secure communication with the connected object.

However this third solution is not satisfactory in that it requires firstly the use of an out-of-band channel, and secondly the use of a trusted gateway, in this case the smartphone.

Consequently, the purpose of this invention is to propose a method for setting a secure end-to-end communication between a user terminal and a connected object, particularly a connected object with energy, memory and calculation capacity constraints, and that does not have the disadvantages of prior art. In particular, the method for setting up the secure communication with the connected object must make it possible to eliminate the need for a secure element integrated into this connected object and an auxiliary communication channel to transfer the cryptographic material. Finally and especially, it must allow direct access to the resource supplied by the connected object without requiring virtualisation or a trusted gateway.

PRESENTATION OF THE INVENTION

This invention is defined by a method for setting up a secure end-to-end communication between a user terminal/context broker server and a connected object, said method making use of a first server called the access authorisation server, and a second server called the production server, the user terminal communicating with the access authorisation server through a first secure communication and the production server communicating with the access authorisation server through a second secure communication, the access authorisation server hosting a first database containing information to authenticate the different users and to manage their access rights to the different connected objects, the production server hosting a second database containing identifiers of the connected objects and having an initial private and public key pair ($K_{init}$, $Q_{init}$), said method including the following steps:

(a) following a user request containing the identifier of the connected object (SN), request from the access authorisation server to the production server to verify that this identifier is valid;

(b) when the connected object is initialised, identification and authentication of the connected object by the production server, using a first message ($M_1$) containing the identifier of the connected objected and the same identifier, encrypted by the initial public key ($Q_{init}$);

(c) if the connected object is successfully authenticated, the access authorisation server generates a second message ($M_2$) containing the parameters of a cryptosystem, the second message being previously signed by the production server, the message and its signature (sgn($M_2$)) being transmitted to the connected object;

(d) the connected object generates a private and public access key pair ($K_F,Q_F$), starting from the parameters of the cryptosystem, to set up a third secure communication (225) between the access authorisation server and the connected object;

(e) set up a secure communication between the user terminal, resp. the context broker server, and the connected object by means of a symmetric key distributed by the access authorisation server, firstly to the user terminal through the first secure communication, resp. the broker server, through a fourth secure communication, secondly to the connected object through the third secure communication.

In step (a), the production server advantageously timestamps the identifier of the connected object and stores the timestamp in the second database using said identifier.

During its initialisation in step (b), the connected object generates a session token (TK) in the form of a first random number ($RN_1$), and a second random number ($RN_2$).

The first message ($M_1$) advantageously comprises a first plain text (unencrypted) part including the identifier of the connected object (SN), and a second part encrypted using the initial public key ($Q_{init}$), the second part including the same identifier, the session key and possibly a certificate ($CQ_{init}$) for the initial public key.

In step (b), the production server identifies the connected object if its identifier is present in the second database.

Furthermore, in step (b), the production server authenticates the connected object by decrypting the second part of the first message using the initial private key and comparing the result of the decryption with the first part.

Preferably in step (b), the production server only declares the connected object if the timestamp has not expired on the authentication date.

The production server can then transmit the authentication result (ACK,NACK) to the access authorisation server together with the identifier number of the connected object and, possibly, the certificate of the initial public key ($CQ_{init}$).

If the authentication in step (b) is successful, the access authorisation server stores the session token in the first database using the identifier of the connected object.

Advantageously, in step (c), the second message ($M_2$) includes the identifier of the connected object (SN), the session token (TK), the public key of the access authorisation server ($Q_{auth}$) and the parameters of a cryptosystem.

Preferably, the cryptosystem is a cryptosystem on an elliptical curve.

The production server signs the second message using the initial private key and sends the signature thus obtained (sgn($M_2$) to the access authorisation server.

The access authorisation server then transmits the second message ($M_2$) and its signature (sgn($M_2$) to the connected object.

According to a first variant, in step (d), the connected object generates a temporary public key starting from the second random number and a generating point (G) on the elliptical curve.

The connected object can then generate a third message ($M_3$) containing its plain text (unencrypted) identifier in a first part, and the same identifier, the certificate of the initial public key ($CQ_{init}$), the access token and the temporary public key ($Q_{temp}$) in a second part encrypted using the public key of the access authorisation server ($Q_{auth}$).

The access authorisation server advantageously generates an implicit certificate of a public access key ($Cert_F$) and a signature of this certificate ($Sign_F$) using the temporary public key ($Q_{temp}$), a third random number (k), the session token (TK), the private key of the authorisation server ($K_{auth}$) and parameters of the cryptosystem on an elliptical curve.

The access authorisation server then generates a fourth message ($M_4$) containing the implicit certificate of the public access key ($Cert_F$) and its signature ($Sign_F$), this message and its signature (Sgn($M_4$)) using the private key of the access authorisation server being transmitted to the connected object.

After having checked the integrity of the fourth message by using the public key of the access authorisation server, the connected object advantageously generates said private and public access key pair ($K_F,Q_F$) from the implicit signature of the public access key ($Cert_F$) and its signature ($Cert_F$), the session token (TK), the public access authorisation key ($Q_{auth}$) and parameters of the cryptosystem on an elliptical curve.

According to a second variant, the connected object generates the private access key ($K_F$) from the second random number ($RN_2$) and the public access key ($Q_F$) from the private access key and the parameters of the cryptosystem on an elliptical curve.

In this case, the connected object advantageously generates a third message ($M_3$) containing its plain text (unencrypted) identifier in a first part, and the same identifier, the certificate of the initial key ($CQ_{init}$), the access token and the public access key ($Q_F$) in a second part encrypted by the public key of the access authorisation server ($Q_{auth}$).

The access authorisation server then generates an X.509 certificate ($Cert_{X.509}$) of the public access key ($Q_F$), using the identifier of the connected object and the public access key, using its private access authorisation key ($K_{auth}$).

The access authorisation server can also generate a fourth message ($M_4$) containing the certificate of the public access key ($Cert_{X.509}$) and its signature ($Sign_{auth}(M_4)$) using the private key of the access authorisation server, this message and its signature ($Sign_{auth}(M_4)$) being transmitted to the connected object.

After having identified the integrity of the fourth message using the public key of the access authorisation server, the connected object advantageously stores the certificate of the public access key ($Cert_{X.509}$) in its memory.

BRIEF DESCRIPTION OF THE DRAWINGS

Other characteristics and advantages of the invention will become clear after reading a preferred embodiment of the invention with reference to the attached figures among which.

DETAILED PRESENTATION OF PARTICULAR EMBODIMENTS

Throughout the remainder of this description, the term connected objects refers to objects with a communication capability, usually using a single wireless communication standard (IEEE 802.15.4, Bluetooth, Zigbee, etc.) but with very limited resources (CPU, RAM, flash memory size, energy). For example, the objects will only have a few tens of bytes of RAM and a few hundred or even a few thousand kilobytes of flash memory. In particular, these connected objects may be sensors organised in the form of a wireless network or WSN (Wireless Sensor Network).

Figure 1:
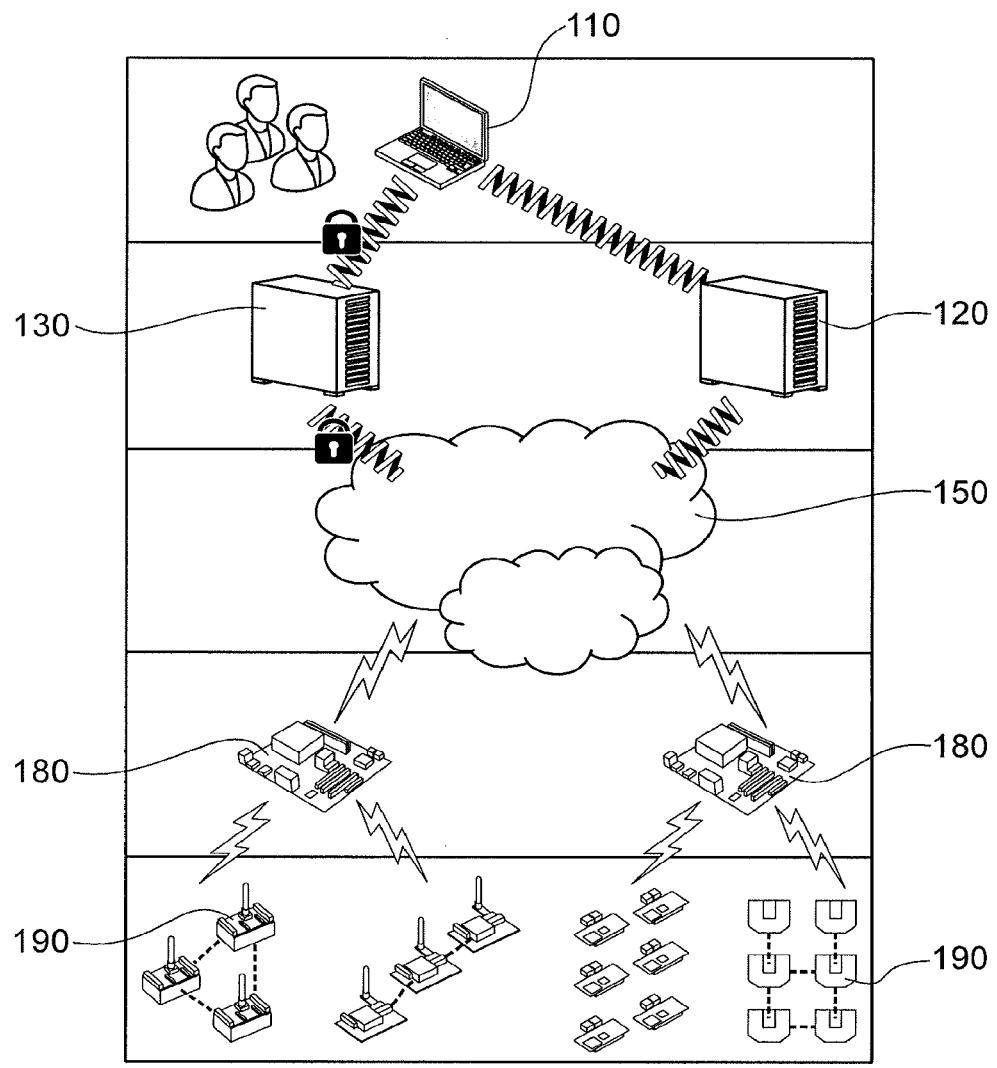
FIG. 1 diagrammatically represents a scenario for a user to access a resource associated with a connected object as known according to the state of the art.
Figure 2:
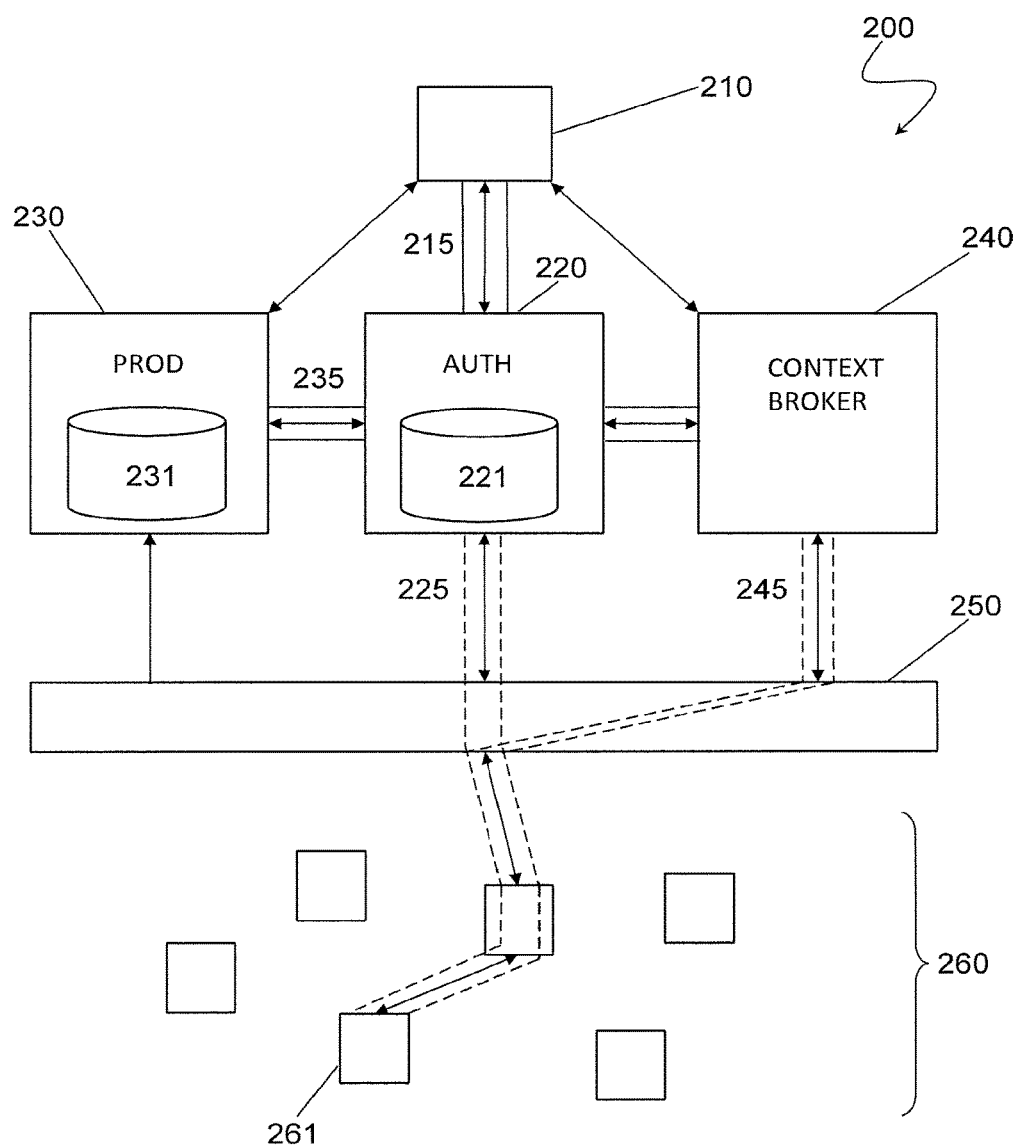
FIG. 2 diagrammatically represents the architecture of a system for setting up a secure communication between a user terminal and a connected object.

FIG. 2 diagrammatically represents the architecture of a system for setting up a secure communication between a user terminal and a connected object.

The system 200 comprises a user terminal, more simply referred to as a user 210, a first server called the access authorisation server 220, and a second server called the production server 230. The user terminal may be a smartphone, a tablet or a computer. The user can connect to the access authorisation server through Internet using a protocol such as HTTPS (HyperText Transfer Protocol Secured) or SSH (Secure SHell).

The access authorisation server 220 hosts a first database 221 containing information necessary to authenticate the different users, to manage their access rights to the different connected objects and thus to authorise user access to these objects. It does this by managing profiles of different users or user groups. For example, a list of connected objects determined by the identifiers of the objects is associated with each user (or group of users). Thus, the authorisation server can determine if a given user can access a specific resource of a connected object, possibly distinguishing if he can access it through a virtualisation gateway or through a secure end-to-end communication.

The production server 230 is connected to the access authorisation server through a secure communication 235, for example using a protocol such as HTTPS (HyperText Transfer Protocol Secured) or SSH (Secure SHell).

The production server hosts a second database 231 containing particularly identifiers (for example serial numbers) of the different connected objects and the initial cryptographic material that was used when their EEPROMs were flashed (or stored in an internal memory). The initial cryptographic material may include an initial public and private key pair $(K_{init}, Q_{init})$ of an asymmetric encryption system $CQ_{init}$ associated with the public key, for example an X.509 certificate. However, the encryption used is preferably an elliptical curves encryption using implicit certificates based on the principle summarised below. In this case, the certificate $CQ_{init}$ of the initial public key is composed of the implicit certificate $Cert_{init}$ and the signature of the certificate, $Sign_{init}$, by the production server.

As mentioned above, the production server may use an elliptical curves encryption with implicit certificates. It is assumed that the production server has an identifier $ID_{prod}$ and a private and public key pair $(K_{prod}, Q_{prod})$ of an asymmetric system.

The implicit certificate $Cert_{init}$ is composed firstly of two random numbers $\lambda$ and $\mu$:

$$Cert_{init} = \lambda G + \mu G \bmod n \quad (1)$$

where G is an order generator system n of the elliptical cryptosystem. Therefore the implicit certificate is a point on the elliptical curve (multiple of G). The initial signature is obtained using:

$$Sign_{init} = h_{init}\lambda + K_{prod} \bmod n \quad (2)$$

in which $h_{init} = H(Cert_{init} \| ID_{prod})$, H is a hash function such as SHA and $\|$ is the concatenation symbol. The initial public key $Q_{init}$ is deduced directly from the implicit certificate:

$$Q_{init} = h_{init} Cert_{init} + Q_{prod} \quad (3)$$

and the associated private key is obtained by:

$$K_{init} = (h_{init}\lambda + Sign_{init}) \bmod n \quad (4)$$

The connected objects 261, possibly organised in the form of a network 260, do not have communication resources by which they can be connected directly to Internet. They do this using a gateway 250 that makes the interface between the wireless communication standard used by the connected objects (IEEE 802.15.4, Bluetooth, Zigbee, etc.) and the Internet IP infrastructure.

Each connected object has a serial number (SN) physically associated with it (for example inscribed on the object concerned). Each object also contains the following in its EEPROM:
  the URL of the production server $URL_{prod}$ that flashed the EEPROM;
  public elements of the initial cryptographic material, namely the initial public key, $Q_{init}$, and its certificate $CQ_{init}$.

The URL of the production server, $URL_{prod}$, and public elements of the initial cryptographic material are advantageously stored in a secure (encrypted) part of the memory (EEPROM) of the connected object.

The different connected objects produced during a given production interval may all contain the same cryptographic material elements $Q_{init}$, $CQ_{init}$. However, the production server may have several precompiled images of the software to be installed in the EEPROMs of the connected objects, these precompiled images corresponding to distinct cryptographic materials (different key pairs $(K_{init}, Q_{init})$ and different certificates $CQ_{init}$). During production, the precompiled images are then used to flash EEPROMs of connected objects at random.

Once the secure end-to-end communication has been set up, in other words from the user terminal to the connected object through the access authorisation server 220, the user can communicate directly and securely with the connected object.

Alternately, the access authorisation server 220 can set up a secure communication 245 between a context broker server 240 and the connected object. Remember that the function of a context broker is to contextualise data provided by the different connected objects, for example measurements made by different sensors, for example by geopositioning them and/or time-dating them. The user can then view contextualised data using a secure communication means.

Figure 3:
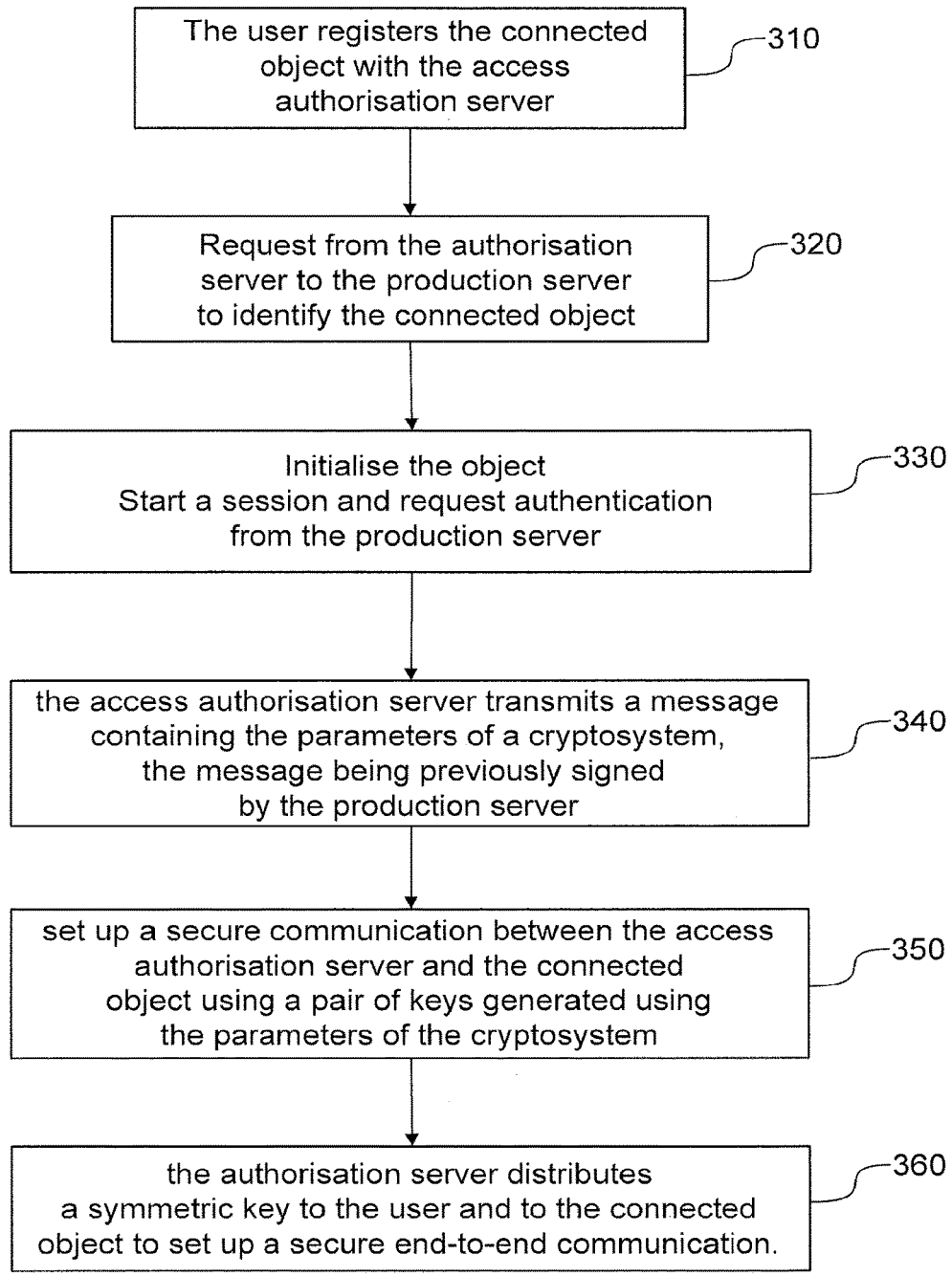
FIG. 3 diagrammatically represents a flow chart for a method for setting up a secure communication between a user terminal and a connected object, according to one embodiment of the invention.

FIG. 3 diagrammatically represents a flow chart and a method for setting up a secure communication between a user terminal and a connected object, according to one embodiment of the invention.

In a previous step 310, the user 210 registers a connected object 271 in an access authorisation server. More precisely, the user sends a register request to the access authorisation server with the serial number SN of the connected object concerned and the URL $URL_{prod}$ of the production server as arguments. The access authorisation server registers the serial number SN under the user's profile with the address $URL_{prod}$ associated with the connected object.

In a first step 320, following a user request containing the identifier of the connected object (SN), the access authorisation server asks the production server if this identifier is valid;

When the production server receives this verification request, it can timestamp the serial number SN and register the timestamp (or timestamp value) obtained TS(SN) in the second database 231, in relation with the serial number.

The connected object is initialised in a second step 330 independent of the first step. Subsequent to this initialisation, the production server authenticates the connected object. To achieve this, the connected object transmits a first message ($M_1$) containing the identifier of the connected object and the same identifier, encrypted by the initial public key ($Q_{init}$);

More precisely, during its initialisation, the connected object generates a first random number ($RN_1$) that will be used as a session token TK (TK=$RN_1$) and a second random number ($RN_2$) that will be used later to generate the private key of the connected object. Random numbers are generated for example using a series of physical measurements.

The connected object then transmits an open session request to the production server 230. To achieve this, the connected object sends a first message $M_1$ to the production server, containing the serial number of the connected object in an unencrypted part, and the session token, the serial number SN and the certificate of the initial public key $CQ_{init}$, in a part encrypted by the initial public key $Q_{init}$.

The production server 230 checks if the serial number is valid, in other words if it is listed in the database 231. It also authenticates the object concerned. To achieve this, the production server decrypts the encrypted part of the first message using the initial private key $K_{init}$ and determines if the serial number contained in the encrypted part is the same as the serial number SN contained in the unencrypted part of the first message.

Optionally, the production server checks if the timestamp value TS(SN) of the serial number SN is recent, in other words it is not earlier than t−Δ in which t is the check date and Δ is the expiration time. If the expiration check is implemented, authentication is considered to have succeeded if the timestamp is not out of date.

In a third step 340, if authentication is successful, the access authorisation server generates a second message ($M_2$) containing the parameters of a cryptosystem, this second message being previously signed by the production server, the message and its signature being transmitted to the connected object;

More precisely, if authentication is successful, the production server registers the session token TK in its database 231, in relation with the serial number SN. It also transmits the authentication result (ACK) to the access authorisation server accompanied by the session token TK, and the certificate $CQ_{init}$ of the initial public key.

If authentication fails, the procedure to set up a secure end-to-end communication is aborted.

The authorisation server is thus informed of the identification and authentication of the connected object by the production server.

The access authorisation server then transmits a second message $M_2$ to the connected object, containing all information necessary for the creation of a secure channel between the access authorisation server and the connected object. However, since the access authorisation server is unknown to the connected object at this stage, the connected object has the message $M_2$ signed beforehand by the production server using the key $K_{init}$. The access authorisation server sends the message $M_2$, accompanied by the signature $Sgn_{prod}$ ($M_2$) thus obtained, to the connected object. Note that the information contained in the message $M_2$ is public. Preferably, the message $M_2$ will contain the serial number SN, the session token TK, the public key of the access authorisation server $Q_{auth}$ and the parameters of a cryptosystem to generate a private and public key pair, all unencrypted. For example, if the chosen cryptosystem is based on elliptical curves, in other words if it is an ECC (Elliptic Curve Cryptography) system, the parameters transmitted are standard parameters describing the elliptical curve (domain size, curve parameters, generating point, order of the curve and cofactor).

In step 350, the connected object and the access authorisation server can set up a secure communication using the private and public keys ($K_{auth}$,$Q_{auth}$). The connected object and the access authorisation server use this secure communication to exchange the necessary information to generate a private and public key pair ($K_F$,$Q_F$) and a certificate Cert$_F$ of the public key $Q_F$. More precisely, during this exchange, the connected object generates the key pair ($K_F$,$Q_F$) and the access authorisation server generates the certificate Cert$_F$. It will be noted that the operation requiring the most calculation resources, namely generation of the certificate, is done by the access authorisation server.

At the end of step 350, the access authorisation server has firstly a first secure channel 215 with the user, and a second secure channel 225 (by means of the key pair ($K_F$,$Q_F$)) with the connected object. It will be noted that unlike the state of the art, the secret key $K_F$ was generated by the connected object itself.

In step 360, the access authorisation server can then distribute a symmetric key to the two parties (user and connected object) using the secure channels 215 and 225, to set up a secure end-to-end communication between them.

Alternatively, the access authorisation server can distribute a symmetric key to the connected object and the context broker server, to set up a secure communication between them.

The access authorisation server can also transmit an access token through these same secure channels to the two parties (firstly the connected object and secondly the user terminal, or firstly the connected object and secondly the context broker server). In particular, the access token provides access to particular resources or services provided by the broker server.

Figure 4A:
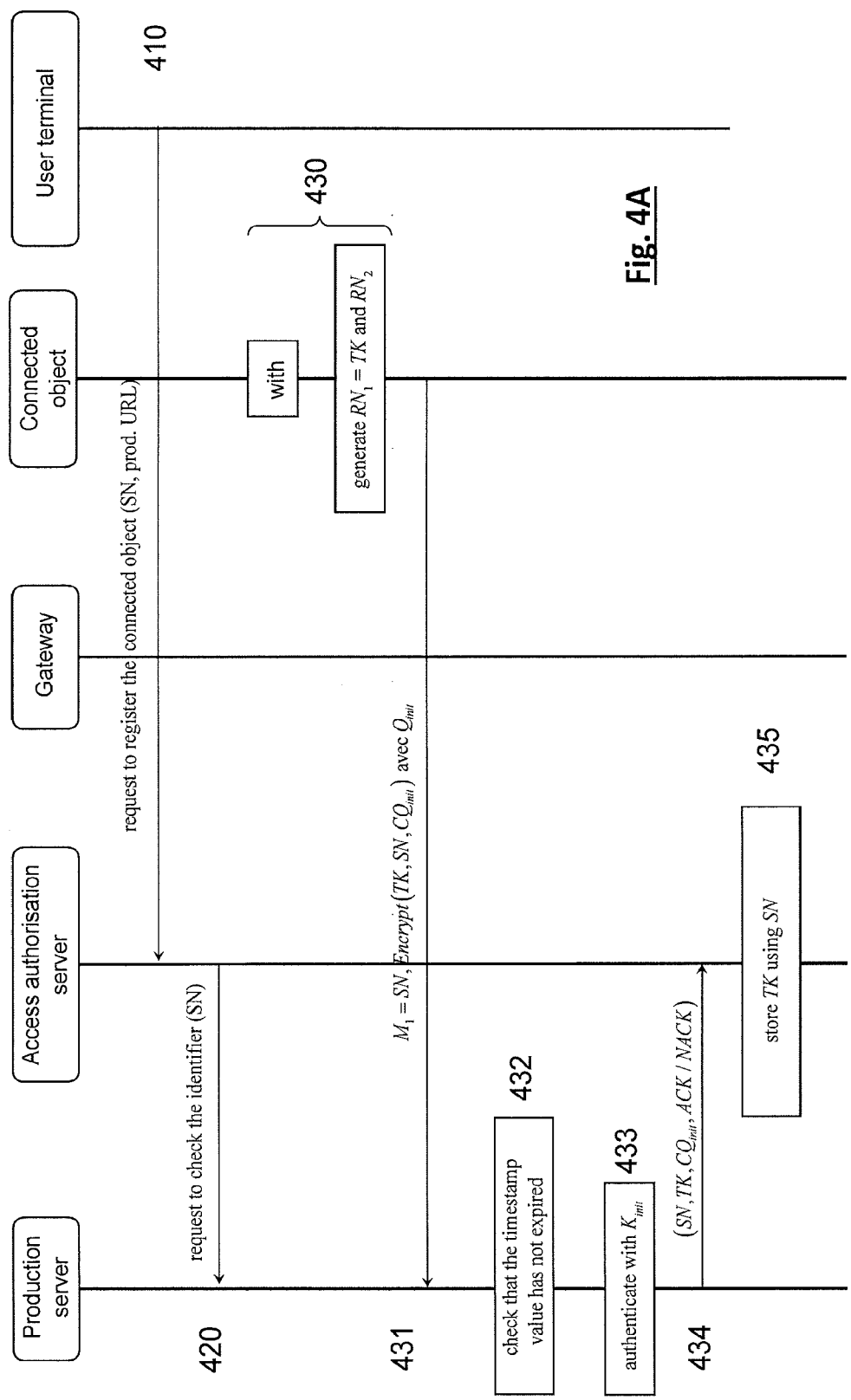
FIGS. 4A and 4B represent a first part of exchanges between the elements of the system in FIG. 2 when using the method for setting up a secure communication according to the embodiment of the invention shown in FIG. 3.
Figure 4B:
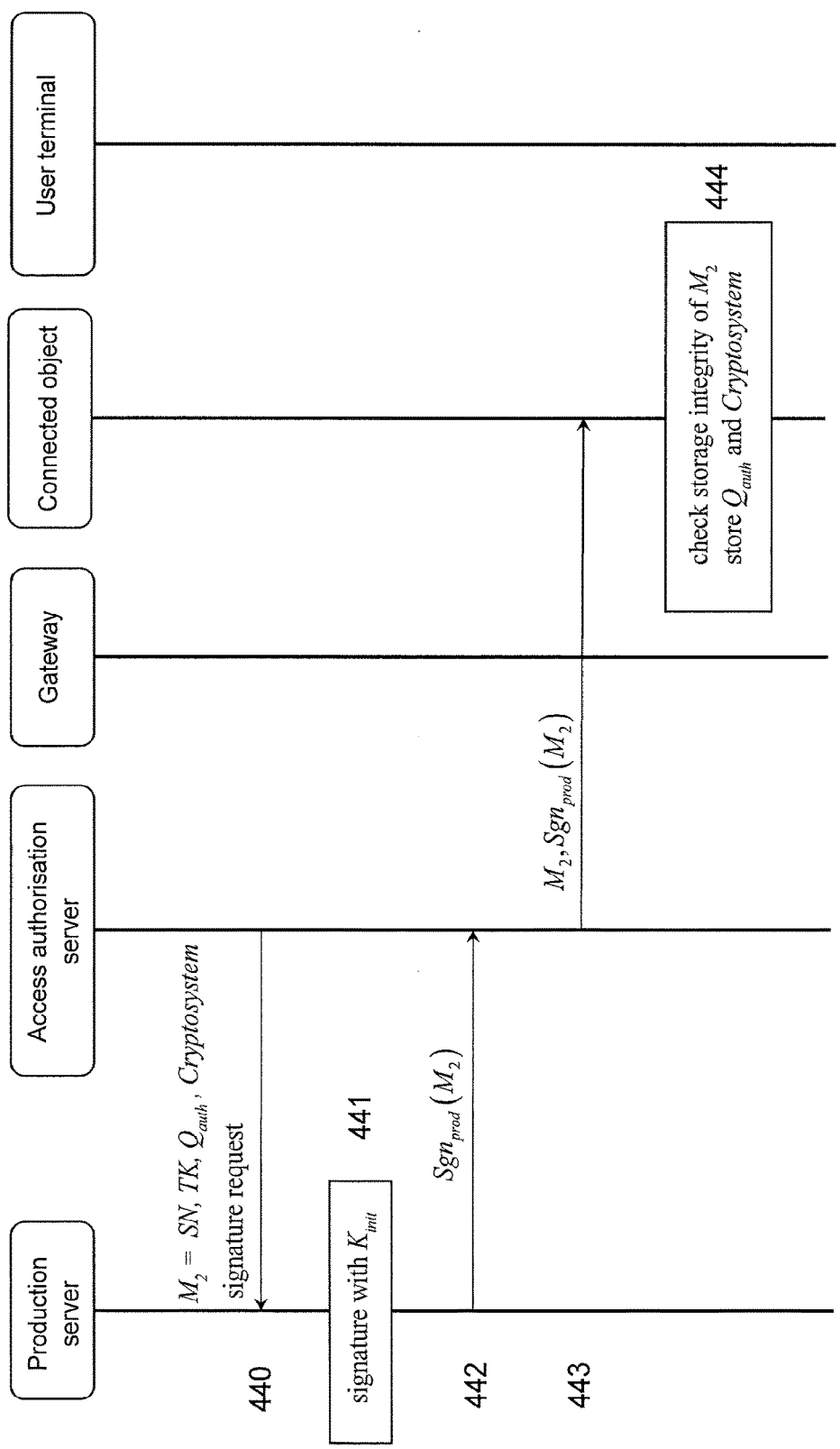

FIGS. 4A and 4B represent a first part of exchanges between the different elements of the system in FIG. 2 when using the method for setting up a secure communication according to the embodiment of the invention described above. This first part is common to first and second variants of this embodiment.

The different elements of the system, namely the user terminal 210, the production server 230, the access authorisation server 220, the gateway 250 and the connected object 261, are shown in the time diagram.

In step 410, the user sends a register request to the access authorisation server with the identifier (for example the serial number SN) of the connected object concerned and the URL $URL_{prod}$ of the production server as arguments. This request is transmitted through the secure channel 215 (HTTPS or SSH).

The access authorisation server then transmits a verification request to the production server, with the identifier of the connected object as argument, in step 420 through the secure channel 235. The production server then determines if the identifier is actually in the second database 231. If it is, in step 421 time-dates the request and stores the time-date stamp TS(SN) in the second database 231 using the identifier. It them confirms that the connected object is correctly identified to the authorisation server in 422.

The user initialises the connected object in step 430. During or after its initialisation, the connected object generates a first random number ($RN_1$) that will be used as a session token TK (TK=$RN_1$) and a second random number ($RN_2$) that will be used later to generate the private key of the connected object. It then transmits a first message $M_1$ to the production server in 431 including a part containing the unencrypted part, and a second part encrypted by the initial public key $Q_{init}$. The first part contains the identifier (SN) and the second part contains the session token, the identifier and the certificate of the initial public key $CQ_{init}$. When the encryption is an elliptical curves encryption using implicit certificates, the certificate $CQ_{init}$ is composed of an implicit certificate $Cert_{init}$ and its signature, $Sign_{init}$ by the production server.

The production server recovers the timestamp in the second data base, from the identifier of the connected object. In 432, if the timestamp value is earlier than t−Δ in which t is the check date and Δ is an expiration time, the declaration of the connected objected is considered to have expired (so that the user will have to renew the declaration) and the authentication fails. The production server then decrypts the second part of the message and in 433 compares the value of the identifier in the second decrypted part with that in the first part. When these two values are the same, the production server considers that the connected object is authenticated. Otherwise, authentication fails. In any case, in 434 the production server transmits an authentication message to the access authorisation server through the secure channel 215. This authentication message contains the identifier of the connected object (SN), the session token TK, the certificate of the initial public key $CQ_{init}$, and the authentication result (ACK or NACK).

The access authorisation server is thus informed that the connected object has been correctly identified and authenticated. It then registers the session token in 435 in the first database, using the identifier of the object in question.

The access authorisation server builds a second message $M_2$, containing all information necessary for setting up a secure channel between the access authorisation server and the connected object, and sends it to the production server in 440. The message $M_2$ contains the identifier SN, the session token TK, the public key of the access authorisation server $Q_{auth}$ and the parameters of a cryptosystem (Cryptosystem), all unencrypted, to generate a private and public key pair.

The production server signs the message $M_2$ in 441 using the initial private key $K_{init}$ and sends the signature thus obtained ($Sign_{prod}(M_2)$) to the access authorisation server, in 442. The access authorisation server sends the message $M_2$ in 443, accompanied by the signature $Sign_{prod}(M_2)$ thus obtained, to the connected object.

In 444, the connected object uses the initial public key $Q_{init}$ to check that the message $M_2$ is correctly included and if it is, stores the public key $Q_{auth}$ and parameters of the cryptosystem (Cryptosystem) in its memory.

The following exchanges between elements of the system depend on which variant is considered.

Figure 5A:
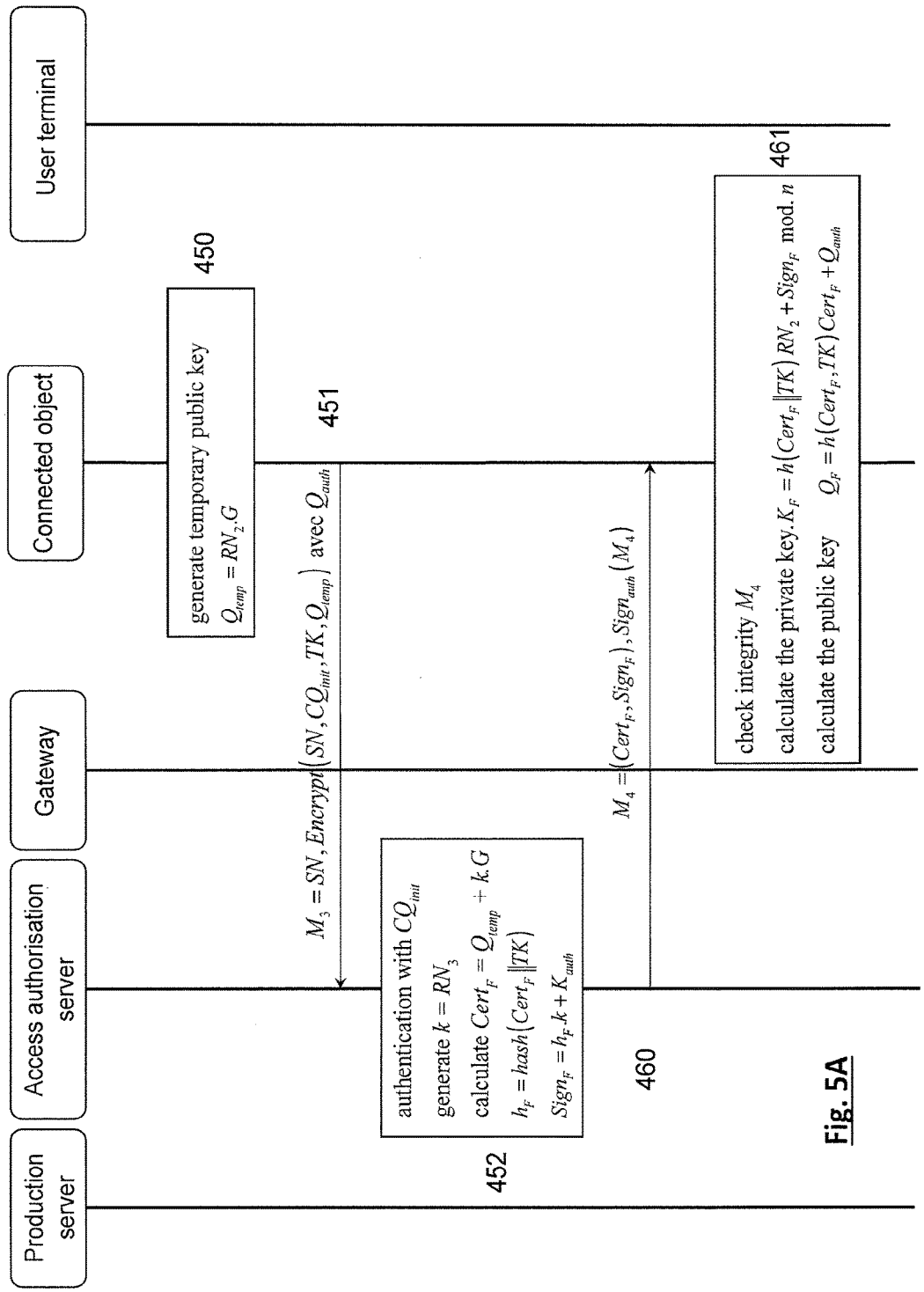
FIG. 5A represents a second part of exchanges between the elements of the system in FIG. 2 when using the method for setting up a secure communication according to a first variant of the embodiment of the invention shown in FIG. 3.

FIG. 5A represents a second part of exchanges between the elements of the system in FIG. 2 when using the method for setting up a secure communication according to a first variant of the embodiment of the invention. This second part follows after the description of the first part given with reference to FIGS. 4A and 4B.

This first variant uses a elliptical curves cryptosystem with implicit certificates. In this case, the parameters of the cryptosystem (Cryptosystem) in the message $M_2$ are p the characteristic of the body, a,b the parameters of the elliptical curve, G, a generating point on the elliptical curve and n the order of G.

In step 450, the connected object generates a temporary public $Q_{temp}$ starting from a private key $K_{temp}$ taken to be equal to the second random number $RN_2$. In 451, the connected object transmits a third message, $M_3$, including a first plain text part and a second part encrypted using the public $Q_{auth}$, that it obtained in the previous step. The first part contains the identifier of the connected object. The second part also contains this identifier, the certificate of the initial key, $CQ_{init}$, the session token and the temporary public key, $Q_{temp}$. The presence of the initial key certificate $CQ_{init}$ in message $M_3$ makes it possible to authenticate the connected object with the access authorisation server and consequently to avoid "man-in-the-middle" type attacks.

In 452, the access authorisation server authenticates the connected object using the initial key certificate $CQ_{init}$. After having authenticated the connected object, it generates a third random number $RN_3$ and calculates an implicit certificate:

$$Cert_F = Q_{temp} + kG \qquad (5)$$

It then obtains a hash value from the certificate and the session token, namely:

$$h_F = h(Cert_F \| TK) \qquad (6)$$

where h is a hash function and $Cert_F \| TK$ represents the implicit certificate concatenated to the session token.

The access authorisation server then signs the certificate using its private key $K_{auth}$ (in this case acting as the master key), to provide the signature of the certificate:

$$Sign_F = h_F k + K_{auth} \qquad (7)$$

Finally in 460, the access authorisation server forms a fourth message $M_4$, including the certificate ($Cert_F, Sign_F$) and transmits it to the connected object. It also sends the signature of the message $M_4$, $Sign_{auth}(M_4)$, using the private key $K_{auth}$.

In 461, the object verifies the integrity of the fourth message using the public key $Q_{auth}$. If this is the case, it calculates a private key $K_F$ and public key $Q_F$ pair as follow:

$$K_F = h(Cert_F \| TK) RN_2 + Sign_F \bmod n \qquad (8)$$

$$Q_F = h(Cert_F, TK) Cert_F + Q_{auth} \qquad (9)$$

When step 461 is finished, the connected object and the access authorisation server each have a set of asymmetric keys ($K_F, Q_F$) and ($K_{auth}, Q_{auth}$) respectively, so that they can set up a secure communication between each other 225.

The access authorisation server can then transmit a symmetric key both to the user terminal and the connected object, or to the context broker server and to the connected object. These two elements can then directly set up a secure link between themselves without the need to qualify the gateway as a trusted gateway.

Figure 5B:
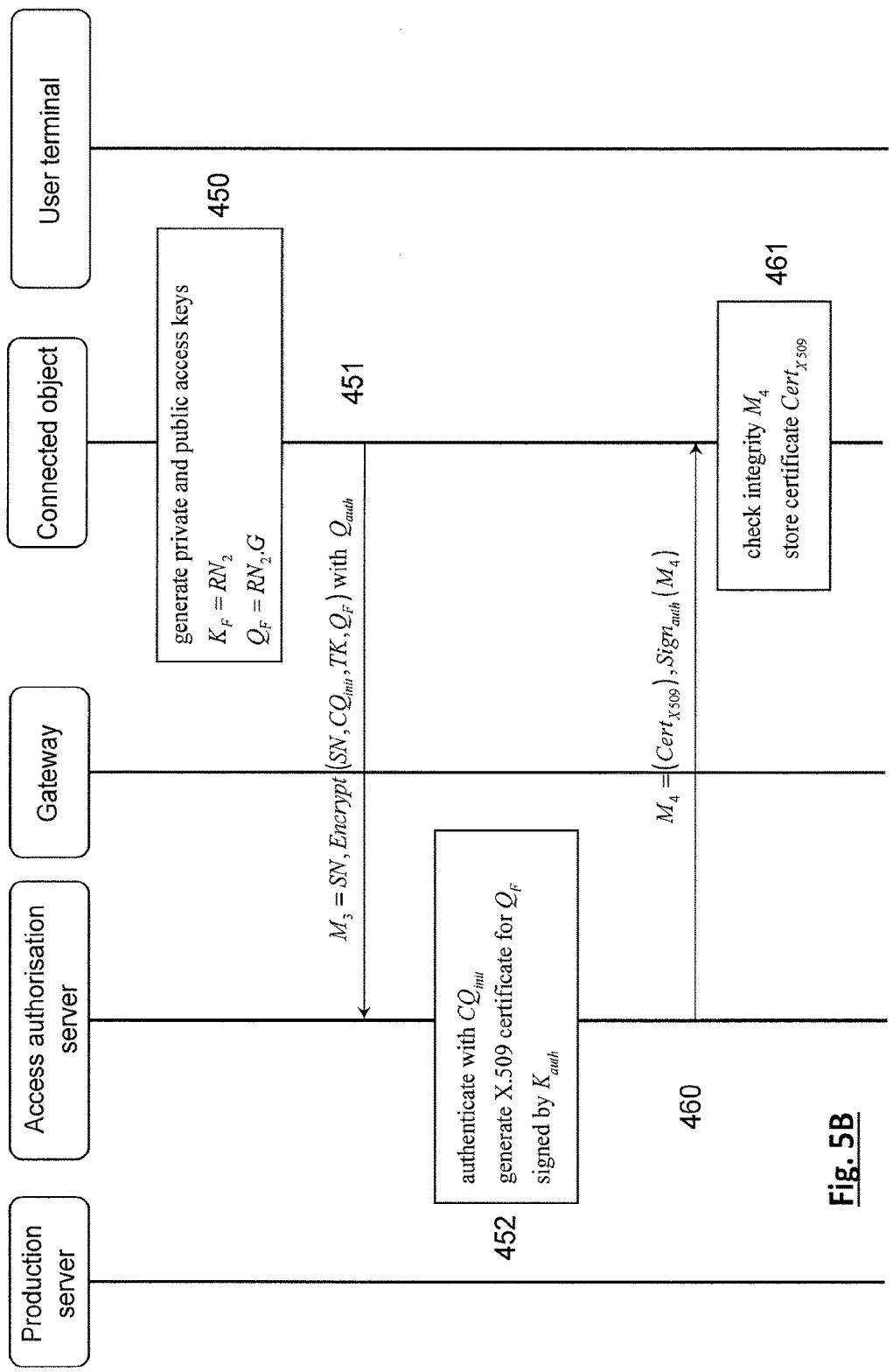
FIG. 5B represents a second part of exchanges between the elements of the system in FIG. 2 when using the method for setting up a secure communication according to a second variant of the embodiment of the invention shown in FIG. 3.

FIG. 5B represents a second part of exchanges between the elements of the system in FIG. 2 when using the method for setting up a secure communication according to a second variant of the embodiment of the invention. This second part thus follows on from the description of the first part given with reference to FIGS. 4A and 4B.

Unlike the first variant, a temporary key is not generated in step 450, instead the private key $K_F$ and the public key $Q_F$ are generated directly from the second random number $RN_2$ and the parameters of the cryptosystem received in the previous step. If a cryptosystem is used on elliptical curves with parameters (p,a,b,G,n), the private key $K_F$ is simply $K_F = RN_2$ and the public key $Q_F$ is obtained by:

$$Q_F = K_F \cdot G \quad (10)$$

The connected object then requests a certification of its public key with the access authorisation server. To achieve this, the connected object transmits a third message $M_3$ in 451, including a first plain text part and a second part encrypted using the public key $Q_{auth}$ that it obtained in the previous step. The first part contains the identifier of the connected object. The second part also contains the identifier, the certificate of the initial key $CQ_{init}$ and the public key $Q_F$ generated in 450. As in the first variant, the initial key certificate $CQ_{init}$ are sufficient to authenticate the connected object with the access authorisation server and consequently to avoid "man-in-the-middle" type attacks.

In 452, the access authorisation server verifies the integrity of the message $M_3$ using its private key $K_{auth}$ and authenticates the connected object using the initial key certificate $CQ_{init}$. It then generates a public key certificate $Cert_{X.509}$ in the X.509 format starting from the identifier SN and the public key $Q_F$. The certificate is signed using its private key $K_{auth}$. It will be noted that in this case the certificate is auto-signed since the access authorisation server also acts as certification authority.

In 461, the access authorisation server transmits a fourth message $M_4$ and its signature $Sign_{auth}(M_4)$ using the private key $K_{auth}$ to the connected object. The connected object verifies the integrity of the message $M_4$, using the public key $Q_{auth}$. When the integrity of the message has been confirmed, the connected objected stores the X.509 certificate $Cert_{X.509}$ in its memory.

However, this second variant requires a larger memory capacity than the first variant due to the size of the X.509 certificate.

As in the first variant, the access authorisation server can send a symmetric key both to the user terminal and the connected object (or even alternatively to the context broker server and to the connected object) to set up a secure communication between these two elements. In both cases, the gateway 250 forming the interface between the wireless communication standard used by the connected object and the Internet IP infrastructure does not have to be trusted.

The invention claimed is:

1. A method for setting up a secure end-to-end communication between a user terminal, a context broker server and a connected device, the user terminal communicating with an access authorization server through a first secure communication and a production server communicating with the access authorization server through a second secure communication, the access authorization server hosting a first database containing information to authenticate the different users and to manage their access rights to the different connected devices, the production server hosting a second database containing identifiers of the connected devices and having an initial private and public key pair, said method comprising the following steps:
   (a) following a user request containing an identifier of the connected device, requesting from the access authorization server to the production server to verify that this identifier is valid;
   (b) when the connected device is initialized, identifying and authenticating the connected device by the production server, using a first message containing the identifier of the connected device and the same identifier, encrypted by the initial public key;
   (c) when the connected device is successfully authenticated, the access authorization server generates a second message containing the parameters of a cryptosystem, the second message being previously signed by the production server, the message and its signature being transmitted to the connected device;
   (d) the connected device generates a private and public access key pair, starting from the parameters of the cryptosystem, to set up a third secure communication between the access authorization server and the connected device;
   (e) setting up a secure communication between the user terminal, the context broker server, and the connected device with a symmetric key distributed by the access authorization server, firstly to the user terminal through the first secure communication, the content broker server, through a fourth secure communication, and secondly to the connected device through the third secure communication.

2. The method for setting up a secure end-to-end communication according to claim 1, wherein in step (a), the production timestamps the identifier of the connected device and stores the timestamp in the second database using said identifier.

3. The method for setting up a secure end-to-end communication according to claim 2, wherein in step (b), the production server only declares the connected device when the timestamp has not expired on the authentication date.

4. The method for setting up a secure end-to-end communication according to claim 1, wherein during its initialization in step (b), the connected device generates a session token in the form of a first random number and a second random number.

5. The method for setting up a secure end-to-end communication according to claim 4, wherein the first message comprises a first plain text part including the identifier of the connected device, and a second part encrypted using the initial public key, the second part including the same identifier, the session key and possibly a certificate for the initial public key.

6. The method for setting up a secure end-to-end communication according to claim 5, wherein in step (b), the production server identifies the connected device when its identifier is present in the second database.

7. The method for setting up a secure end-to-end communication according to claim 6, wherein in step (b), the production server authenticates the connected device by decrypting the second part of the first message using the initial private key and comparing the result of the decryption with the first part.

8. The method for setting up a secure end-to-end communication according to claim 7, wherein when step (b) is finished, the production server transmits the authentication result to the access authorization server together with the identifier number of the connected device and possible the certificate of the initial public key.

9. The method for setting up a secure end-to-end communication according to claim 8, wherein when the authentication in step (b) is successful, the access authorization server stores the session token in the first database using the identifier of the connected device.

10. The method for setting up a secure end-to-end communication according to claim 1, wherein in step (c), the second message includes the identifier of the connected device, the session token, the public key of the access authorization server and the parameters of a cryptosystem.

11. The method for setting up a secure end-to-end communication according to claim 10, wherein the cryptosystem is a cryptosystem on an elliptical curve.

12. The method for setting up a secure end-to-end communication according to claim 11, wherein in step (c), the production server signs the second message using the initial private key and sends the signature thus obtained to the access authorization server.

13. The method for setting up a secure end-to-end communication according to claim 12, wherein the access authorization server transmits the second message and its signature to the connected device.

14. The method for setting up a secure end-to-end communication according to claim 13, wherein the connected device generates the private access key from the second random number and the public access key from the private access key and the parameters of the cryptosystem on an elliptical curve.

15. The method for setting up a secure end-to-end communication according to claim 14, wherein the connected device generates a third message containing its plain text identifier in a first part, and the same identifier, the certificate of the initial key, the access token and the public access key in a second part encrypted by the public key of the access authorization server.

16. The method for setting up a secure end-to-end communication according to claim 15, wherein the access authorization server generates an X.509 certificate of the public access key, using the identifier of the connected device and the public access key, using its private access authorization key.

17. The method for setting up a secure end-to-end communication according to claim 16, wherein the access authorization server generates a fourth message containing the certificate of the public access key and its signature using the private key of the access authorization server, this message and its signature being transmitted to the connected device.

18. The method for setting up a secure end-to-end communication according to claim 16, wherein after having identified the integrity of the fourth message using the public key of the access authorization server, the connected device stores the certificate of the public access key in its memory.

19. The method for setting up a secure end-to-end communication according to claim 13, wherein in step (d), the connected device generates a temporary public key starting from the second random number and a generating point on the elliptical curve.

20. The method for setting up a secure end-to-end communication according to claim 19, wherein the connected device generates a third message containing its unencrypted identifier in a first part, and the same identifier, the certificate of the initial public key, the access token and the temporary public key in a second part encrypted using the public key of the access authorization server.

21. The method for setting up a secure end-to-end communication according to claim 20, wherein the access authorization server generates an implicit certificate of a public access key and a signature of this certificate using the temporary public key, a third random number, the session token, the private key of the authorization server and parameters of the cryptosystem on an elliptical curve.

22. The method for setting up a secure end-to-end communication according to claim 21, wherein the access authorization server generates a fourth message containing the implicit certificate of the public access key and its signature, this message and its signature using the private key of the access authorization server being transmitted to the connected device.

23. The method for setting up a secure end-to-end communication according to claim 22, wherein after having checked the integrity of the fourth message using the public key of the access authorization server, the connected device generates said private and public access key pair starting from the implicit signature of the public access key and its signature, the session token, the public access authorization key and parameters of the cryptosystem on an elliptical curve.

* * * * *